US007193623B2

(12) United States Patent
Moon

(10) Patent No.: US 7,193,623 B2
(45) Date of Patent: Mar. 20, 2007

(54) LIQUID CRYSTAL DISPLAY AND DRIVING METHOD THEREOF

(75) Inventor: Seung-Hwan Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 720 days.

(21) Appl. No.: 10/218,294

(22) Filed: Aug. 14, 2002

(65) Prior Publication Data

US 2003/0043100 A1 Mar. 6, 2003

(30) Foreign Application Priority Data

Aug. 29, 2001 (KR) .............................. 2001-52492

(51) Int. Cl.
*G09G 5/00* (2006.01)
*G09G 3/36* (2006.01)
*G02F 1/1345* (2006.01)

(52) U.S. Cl. ........................ 345/205; 345/87; 349/149

(58) Field of Classification Search .......... 345/87–107, 345/204–215; 349/149, 150; 438/151
See application file for complete search history.

(56) References Cited

U.S. PATENT DOCUMENTS 5,739,887 A * 4/1998 Ueda et al. ................. 349/149
5,856,818 A * 1/1999 Oh et al. ....................... 345/99
6,067,063 A * 5/2000 Kim et al. .................... 345/89
6,219,022 B1 * 4/2001 Yamazaki et al. .......... 345/103
6,232,937 B1 * 5/2001 Jacobsen et al. .............. 345/87
6,268,840 B1 * 7/2001 Huang ......................... 345/94
6,310,592 B1 * 10/2001 Moon et al. .................. 345/87
6,333,730 B1 * 12/2001 Lee ............................ 345/100
6,356,260 B1 * 3/2002 Montalbo ................... 345/204
6,437,775 B1 * 8/2002 Hanari ....................... 345/204
6,456,353 B1 * 9/2002 Chen .......................... 349/150
6,462,727 B2 * 10/2002 Shin ............................ 345/99
6,480,180 B1 * 11/2002 Moon .......................... 345/98
6,483,495 B2 * 11/2002 Kaise et al. .................. 345/93
6,657,622 B2 * 12/2003 Park ........................... 345/205
6,677,936 B2 * 1/2004 Jacobsen et al. ............ 345/211
6,808,965 B1 * 10/2004 Miyasaka et al. ........... 438/151
6,847,346 B2 * 1/2005 Kumagai et al. ............. 345/98

* cited by examiner

*Primary Examiner*—Sumati Lefkowitz
*Assistant Examiner*—Srilakshmi K Kumar
(74) *Attorney, Agent, or Firm*—F. Chau & Assoc., LLC

(57) ABSTRACT

A liquid crystal display (LCD) is provided. A display region formed on an array panel has a plurality of gate lines and a plurality of data lines arranged in rows and columns, respectively. A data driving unit has a plurality of first data driving integrated circuits (ICs) and a plurality of second data driving ICs located proximal to the first data driving ICs, the plurality of first data driving ICs providing first data signals to a corresponding plurality of first data lines and the plurality of second data driving ICs providing second data signals to a corresponding plurality of second data lines. A gate driving unit has a plurality of gate driving ICs for providing scanning signals to the plurality of gate lines. A signal transmission film has a first signal transmission film and a second transmission film, the first transmission film transmitting the scanning signals to the gate driving unit and the first data signals to the plurality of first data driving ICs, and the second transmission film transmitting the second data signals to the plurality of second data driving ICs.

19 Claims, 4 Drawing Sheets

LIQUID CRYSTAL DISPLAY AND DRIVING METHOD THEREOF

BACKGROUND OF THE INVENTION (a) Field of the Invention

The present invention relates to a liquid crystal display (LCD) and a driving method thereof, and more particularly, to an LCD capable of transmitting data at high speed.

(b) Description of the Related Art

Liquid crystal displays (LCDs) are widely used such as in flat panel displays. An LCD generally includes two panels having a plurality of electrodes for generating an electric field, a liquid crystal layer therebetween, and two polarizers attached to outer surfaces of the respective panels for polarizing light. The brightness of light generated out of the LCD is controlled by applying voltage to the plurality of electrodes to rearrange liquid crystal molecules. A plurality of thin film transistors (TFTs) for switching the voltage applied to the plurality of electrodes are formed on one of the panels of the LCD.

A display area is generally located in the middle of the panel having the TFTs for image display. In the display area, a plurality of signal lines such as a plurality of gate lines and data lines are formed in row and column directions, respectively. A plurality of pixel electrodes are also formed in respective pixel areas defined by intersections of the gate lines and the data lines. The TFTs control data signals are transmitted from the data lines and the data signals are output to corresponding pixel electrodes responsive to gate signals transmitted from the gate lines.

A plurality of gate pads and data pads are formed at the periphery of the display area, each of the plurality of gate pads and data pads is connected to a corresponding gate and data line. The pads are directly connected to external driving ICs and provides external gate signals and data signals to the gate lines and the data lines, respectively.

A printed circuit board (PCB) for gate signals and a PCB for data signals are electrically connected to the TFT array panel via a plurality of the driving integrated circuits (ICs). Each driving IC is mounted on a flexible printed circuit (FPC) film which is attached to the TFT array panel.

However, this structure has disadvantages in that the size of the FPC film is large and electrical contact between the driving IC and FPC film may be poor.

A chip on glass (COG) may be used to alleviate some of the above problems. In the COG structure, driving ICs are directly mounted and the connection between driving ICs and PCBs is made by FPC films.

However, other disadvantages remain, for example, the COG structure involve the expensive FPC films, require a large amount of space for connecting the FPC films to the driving ICs, and still may have poor contact between the FPC films and the driving ICs.

One proposal to solve the above disadvantage includes a structure having only one of the driving ICs connected to one FPC film. In such structure, data signals from the FPC film enter into the data driving IC connected thereto and are transmitted to the next data driving IC and so on by shift operations of the data driving ICs connected in parallel. However, in such structure the level of data signals becomes lower due to the resistance of the connected wires.

Accordingly, a need exists for a method for driving a liquid crystal display at high speed, and minimizing the number of films used for transmitting and connecting the printed circuit board with the driving ICs.

SUMMARY OF THE INVENTION

A liquid crystal display (LCD) is provided, which includes: a display region formed on an array panel having a plurality of gate lines and a plurality of data lines arranged in rows and columns, respectively; a data driving unit having a plurality of first data driving integrated circuits (ICs) and a plurality of second data driving ICs located proximal to the first data driving ICs, the plurality of first data driving ICs providing first data signals to a corresponding plurality of first data lines and the plurality of second data driving ICs providing second data signals to a corresponding plurality of second data lines; a gate driving unit having a plurality of gate driving ICs for providing scanning signals to the plurality of gate lines; and a signal transmission film having a first signal transmission film and a second transmission film, the first transmission film transmitting the scanning signals to the gate driving unit and the first data signals to the plurality of first data driving ICs, and the second transmission film transmitting the second data signals to the plurality of second data driving ICs.

According to an embodiment of the present invention, the first data signals are serially shifted into the plurality of first data driving ICs and the second data signals are serially shifted into the plurality of second data driving ICs. The first data signals are inputted to a first data driving IC and shifted to a kth data driving IC, and the second data signals are inputted to a nth data driving IC and shifted to a (k+1)th data driving IC, wherein n is the total number of the data driving ICs, k is the number of the plurality of first data driving ICs, (n−k) is the number of the plurality of second data driving ICs, and k is $0<k<n$. The first data signals inputted to the first data driving IC are provided in reverse order from the shifting of second data signals inputted to the second data driving ICs. Each of the plurality of first data driving ICs and the plurality of second driving ICs includes a shift direction selecting terminal, the shift direction selecting terminal is connected to a first voltage for shifting the first data signals in reverse order and connected to a second voltage for shifting the second data signals in forward order. The first and the second data signals are low voltage differential signals (LVDS) or reduced swing differential signals (RSDS).

According to an embodiment of the present invention, the LCD further includes a printed circuit board (PCB) having a timing controller, wherein the PCB is connected to the signal transmission film and the timing controller transmits the first data signals and the second data signals to the signal transmission film. The data driving unit is disposed at one edge of the array panel and the gate driving unit is disposed at the other edge of the array panel.

A liquid crystal display is also provided, which includes a display region formed on an array panel having a plurality of gate lines and a plurality of data lines arranged in rows and columns, respectively; a data driving unit having a plurality of first data driving ICs and a plurality of second data driving ICs located proximal to the first data driving ICs, the plurality of first data driving ICs providing first data signals to a corresponding plurality of first data lines and the plurality of second data driving ICs providing second data signals to corresponding plurality of second data lines; a gate driving unit having a plurality of gate driving ICs for providing scanning signals to the plurality of gate lines, and a signal transmission film for transmitting the first data signals to the plurality of first data driving ICs and the second data signals to the plurality of second data driving ICs.

According to an embodiment of the present invention, the LCD further includes a second signal transmission film for transmitting the scanning signals to the gate driving unit. The first data signals are inputted to a kth data driving IC and shifted to a first data driving IC, and the second data signals are inputted to a (k+1)th data driving IC and shifted to a nth data driving IC, wherein n is the total number of the data driving ICs, k is the number of the plurality of first data driving ICs, (n−k) is the number of the plurality of second data driving ICs, and k is 0<k<n. The first data signals inputted to the first data driving ICs are provided in forward order from the shifting of second data signals inputted to the second data driving ICs. Each of the plurality of first data driving ICs and the plurality of second driving ICs includes a shift direction selecting terminal, the shift direction selecting terminal is connected to a first voltage for shifting the first data signals in forward order and the shift direction selecting terminal of the plurality of second data driving ICs is connected to a second voltage for shifting the second data signals in reverse order.

According to an embodiment of the present invention, the first data signals are serially shifted into the first data driving ICs and the second data signals are serially shifted into the plurality of second data driving ICs. The first data signals are inputted to a first data driving IC and shifted to a kth data driving IC, and the second data signals are inputted to a nth data driving IC and shifted to a (k+1)th data driving IC, wherein n is the total number of the data driving ICs, k is the number of the plurality of first data driving ICs, (n−k) is the number of the plurality of second data driving ICs, and the k is 0<k<n. The first data signals inputted to the first data driving IC are provided in reverse order, and the second data signals inputted to the nth data driving IC are provided in forward order. Each of the plurality of first data driving ICs and the plurality of second driving ICs includes a shift direction selecting terminal, the shift direction selecting terminal is connected to a first voltage for shifting the first data signals in reverse order and connected to a second voltage for shifting the second data signals in forward order.

According to an embodiment of the present invention, the firs t and the second data signals are low voltage differential signals (LVDS) or reduced swing differential signals (RSDS).

A method of driving an LCD including a display region formed on an array panel having a plurality of gate lines and a plurality of data lines arranged in rows and columns, respectively; a data driving unit having a plurality of first data driving integrated circuits (ICs) and a plurality of second data driving ICs located proximal to the first data driving ICs; a gate driving unit having a plurality of gate driving ICs; and a signal transmission film having a first signal transmission film and a second transmission film is provided, which includes the steps of: serially shifting first data signals into the plurality of first data driving ICs; and serially shifting second data signals into the plurality of second data driving ICs, wherein the shifting into the first and second data driving ICs occur at the same time.

According to an embodiment of the present invention, the first data signals are inputted to a first data driving IC of the first data driving ICs through the first signal transmission film and shifted to a kth data driving IC of the first data driving ICs; and the second data signals are inputted to a nth data driving IC of the second data driving ICs through the second signal transmission film and shifted to a (k+1)th data driving IC of the second data driving ICs, wherein n is the total number of the data driving ICs, k is the number of the plurality of first data driving ICs, (n−k) is the number of the plurality of second data driving ICs, and k is 0<k<n. The first data signals inputted to the first data driving ICs are provided in reverse order from the shifting of second data signals inputted to the second data driving ICs.

A method of driving an LCD including a display region formed on an array panel having a plurality of gate lines and a plurality of data lines arranged in rows and columns, respectively; a data driving unit having a plurality of first data driving integrated circuits (ICs) and a plurality of second data driving ICs located proximal to the first data driving ICs; a gate driving unit having a plurality of gate driving ICs; and a signal transmission film having a first signal transmission film and a second transmission film is provided, which includes the steps of: serially shifting first data signals from a kth data driving IC to a first data driving IC; and serially shifting second data signals from a (k+1)th data driving IC to a nth data driving IC, wherein n is the total number of the data driving ICs, k is the number of the plurality of first data driving ICs, (n−k) is the number of the plurality of second data driving ICs, and the k is 0<k<n.

According to an embodiment of the present invention, the first data signals inputted to the first data driving ICs are provided in forward order from the shifting of second data signals inputted to the second data driving ICs.

BRIEF DESCRIPTION OF THE DRAWINGS

A more complete appreciation of the invention and many of the attendant advantages thereof will be readily apparent as the same becomes better understood by reference to the following detailed description when considered in conjunction with the accompanying drawings in which like reference symbols indicate the same or the similar components, wherein.

DETAILED DESCRIPTION OF PREFERRED EMBODIMENTS

Figure 1:
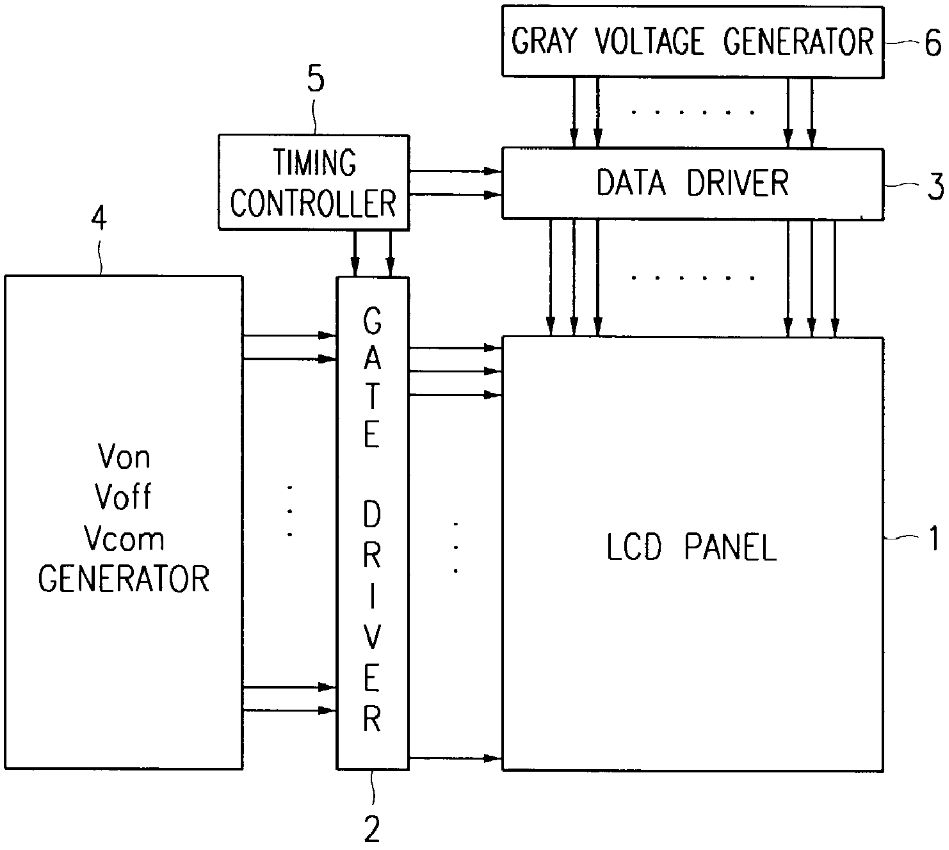
FIG. 1 is a block diagram of LCD driving structure according to an embodiment of the present invention.

Hereinafter, the present invention will be described in detail with reference to the drawing accompanying the most preferred embodiments which those skilled in the art practice the present invention easily.

FIG. 1 is a block diagram of LCD driving structure according to an embodiment of the present invention.

Referring to FIG. 1, the LCD includes an LCD panel 1, a gate driver 2, a data driver 3, a Von Voff Vcom generator 4, a timing controller 5, and a gray voltage generator 6. The LCD panel 1 receives data signals from the data driver 3 and scanning signal from the gate driver 2. The data driver 3 transmits data signals to the LCD panel 1. The gate driver 2 transmits gate signals to the pixels to turn on or off a thin film transistor (TFT) . The Von Voff Vcom generator 4 generates Von voltage for turning on the gate, Voff voltage for turning off the gate, and Vcom voltage as a reference voltage for the TFTs. The timing controller 5 generates timing control signals to controls the timing of the data inputted to the data and gate drivers 2 and 3. The gray voltage generator 6 generates gray voltage inputted to the data driver 3.

Figure 2:
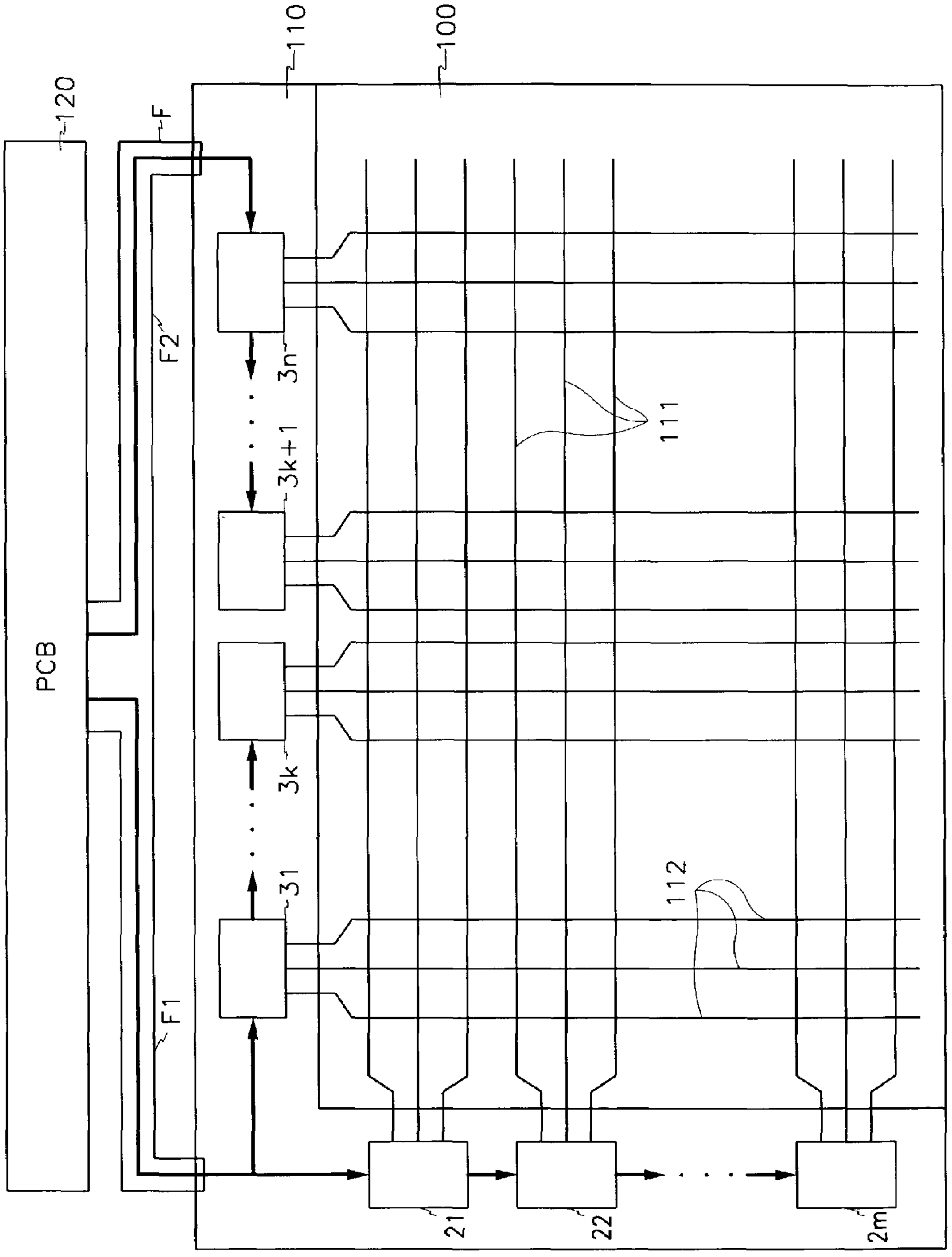
FIG. 2 is a schematic diagram of an LCD according to an embodiment of the present invention.

FIG. 2 shows a schematic structure of LCD according to a first embodiment of the present invention.

Referring to FIG. 2, the LCD includes a TFT array panel 110, a printed circuit board (PCB) 120, and a signal transmission film F disposed between the TFT array panel 110 and the PCB 120. The TFT array panel 110 includes a plurality of gate driving ICs 21~2m located at one edge thereof, a plurality of first data driving ICs 31~3k located at another edge thereof, a plurality of second data driving ICs 3k+1~3n located proximal to the plurality of first data driving ICs 31~3k, and a display region 100 at the middle thereof. The display region 100 includes a plurality of gate lines 111 in the horizontal direction and a plurality of date lines 112 in the vertical direction. The plurality of the gate lines 111 are connected to the plurality of the gate driving ICs 21~2m. The plurality of data lines 112 are connected to the plurality of the first data driving ICs 31~3k and the plurality of the second data driving ICs 3k+1~3n.

According to an embodiment of the present invention, the plurality of first date driving ICs 31~3k, the plurality of second data driving ICs 3k+1~3n, and the plurality of gate driving ICs 21~2m are mounted in the form of a chip on glass (COG) on the TFT array panel 110, and connected to the PCB 120 through the signal transmission film F. According to a preferred embodiment of the present invention, the signal transmission film F includes at least two signal transmission films F1 and F2. The first transmission film F1 includes a first lead wire for transmitting scanning signals and data signals (gray data) provided from the printed circuit board 120 to the plurality of gate driving ICs 21~2m and the plurality of first data driving ICs 31~3k, respectively. The second transmission film F2 includes a second lead wire for transmitting data signals provided from the printed circuit board 120 to the plurality of second data driving ICs 3k+1~3n. According to an embodiment of the present invention, the first and the second transmission films F1 and F2 can be a merged type or a separate type. The first and second transmission films F1 and F2 are preferably electrically connected to the TFT array panel 110 through an anisotropic conducting film (ACF) (not shown). However, one skilled in the art can readily appreciate that the first and second transmission films F1 and F2 can be connected in a number of different ways to the TFT array panel 110.

The first lead wire is connected to a gate signal wire of the first gate driving IC 21 and a data signal wire of the first data diving IC 31 of the plurality of first data driving ICs 31~3k for transmitting scanning signals and data signals, respectively. The second lead wire is connected to the nth data driving IC 3n of the plurality of second data driving ICs 3k+1~3n for transmitting data signals. Therefore, the scanning signals and data signals passed through the first transmission film F1 are inputted to the first gate driving IC 21 and the first data driving IC 31, respectively. The scanning signals are shifted by the first gate driving IC 21, the shifted gate signals are transmitted to the second gate driving IC 22, and finally transmitted to the mth gate driving IC 2m by shift operation. The data signals are shifted by the first data driving IC 31, the shifted data signals are transmitted to the second data driving IC, and finally transmitted to the 3kth data driving IC 3k by the shift operation. The data signals transmitted through the second transmission film F2 are inputted to the nth data driving IC 3n, shifted by the nth data driving IC 3n, and transmitted to the (n−1)th data driving IC by the shift operation. The shifted data signals from the nth data driving IC are transmitted from the nth data driving IC 3n to the (k+1)th data driving IC 3k+1.

That is, according to an embodiment of the present invention, the plurality of first and second data driving ICs 31~3k and 3k+1~3n are disposed in parallel, data signals are inputted from both sides concurrently and shifted, wherein k and n are integers with 0<k <n and k is preferably n/2.

Figure 3:
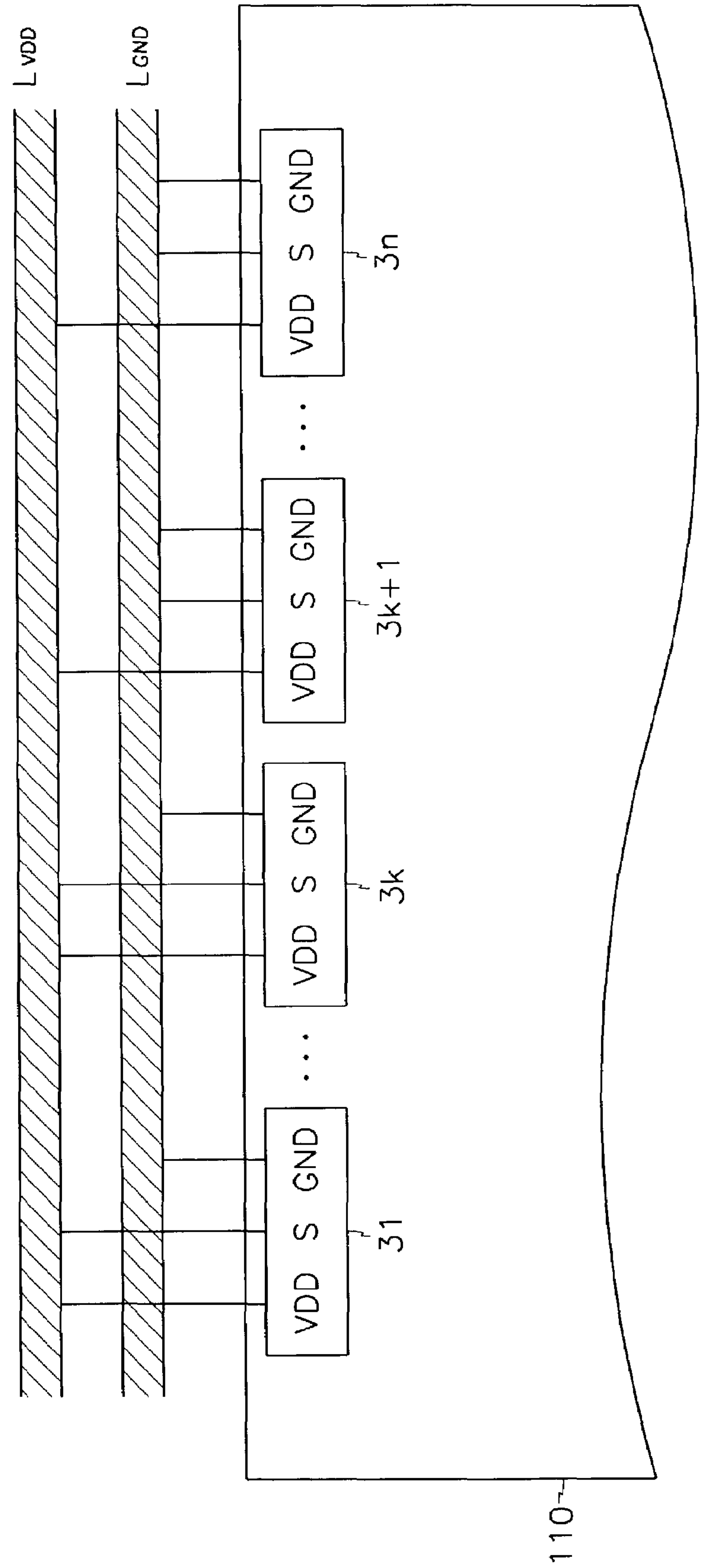
FIG. 3 is a schematic diagram of wiring connections of a plurality of data driving ICs according to an embodiment of the present invention.

FIG. 3 is a schematic diagram of wire connections of a plurality of data driving ICs according to an embodiment of the present invention.

Referring to FIG. 3, each data driving IC can shift data signals in forward direction, that is, from left side to right side. Alternatively, each data driving IC can shift data signals in the reverse direction, that is, from right side to left side. According to an embodiment of the present invention, the shift direction is determined by a signal applied to a shift direction selecting terminal S formed of the plurality of first and second data driving ICs 31~3k and 3k+1~3n.

Either a VDD or a GND voltage is applied to the shift direction selecting terminal S of the data driving ICs to thereby select the shift direction.

According to an embodiment of the present invention, a power wire $L_{VDD}$ and a ground wire $L_{GND}$ are formed in the TFT array panel 110 or in the PCB. The shift direction selecting terminal S is selectively connected to the power wire $L_{VDD}$ and the ground wire $L_{GND}$. When data signal is shifted forwardly from the first data driving IC 31 to the kth data driving IC 3k, the shift direction selecting terminal S is connected to the power wire $L_{VDD}$. When scanning signal is shifted backwardly from the nth data driving IC 3n to the (k+1)th data driving IC 3k+1, the shift direction selecting terminal S is connected to the ground wire $L_{GND}$ That is, each of the shift direction selecting terminal S of the plurality of first data driving ICs 31~3k is connected to the power wire $L_{VDD}$ for shifting data signals transmitted through the first transmission film F1, and each of the shift direction selecting terminal S of the plurality of second data driving ICs 3k+1~3n is connected to the ground wire $L_{GND}$ for shifting data signals transmitted through the second transmission film F2. Therefore, data signals are inputted concurrently to both sides of the plurality of first and second data driving ICs 31~3k and 3k+1~3n, thereby fast and constantly transmitting the data signals to each of the plurality of first and second data driving ICs 31~3k and 3k+1~3n.

An operation of the LCD according to an embodiment of the present invention is described below.

Referring again to FIGS. 1 and 2, a timing controller 5 on the printed circuit board 120 receives image signals from a signal source (not shown) and generates data signals for supplying to the TFT array panel 110. And the timing controller 5 also generates a variety of timing signals, for example, scanning signals necessary to drive the TFT array panel 110. In the following, for the simplicity of explanation, data signals transmitted through the lead wire on the first transmission film F1 are called "the first data signals", and data signals transmitted through the lead wire on the second transmission film F2 are called "the second data signals".

The scanning signals generated from the timing controller 5 are inputted to the first gate driving IC 21 through the first transmission film F1, the inputted scanning signals are shifted by the first gate driving IC 21, and then transmitted to the mth gate driving IC 2m. Also, the first data signals are inputted to the first data driving IC 31 through the first transmission film F1, the inputted first data signal is shifted by the first data driving IC 31, and then transmitted to the kth data driving IC 3k. Since the shift direction selecting terminal S of the first data driving IC 31 to the kth data driving IC 3k is connected to the power wiring $L_{VDD}$, the first data signal inputted to the data driving IC 31 is shifted forwardly and transmitted to the kth data driving IC 3k.

On the other hand, the second data signals transmitted is inputted to the nth data driving IC 3n through the second transmission film F2, and the nth data driving IC 3n shifts the inputted second data signal backwardly and transmits it to the (3k+1)th data driving IC. Since the shift direction selecting terminal S of the (3k+1)th data driving IC 31 to the nth data driving IC 3n is connected to the ground wiring $L_{GND}$, By the shift operation, the first and second data signals are inputted serially to each of the first and second data driving ICs 31~3k and 3k+1~3n. The timing controller 5 outputs the first data signals in reverse order and the second data signals sequentially so that the first and second data signals are inputted serially to the first data driving IC 31 to the nth data driving IC 3n disposed in parallel.

For example, a first to an eighth data driving ICs are disposed in parallel, when data signals of "A, B, C, D, E, F, G, H" are provided to each of the data driving ICs, the first data signals of "A, B, C, D" are provided sequentially in reverse order as "D, C, B, A", then first transmitted data signal "D" is inputted to the fourth data driving IC, the second transmitted data signal "C" is inputted to the third data driving IC, and the third and fourth transmitted data signals "B" and "A" are inputted to the second and first data driving ICs, respectively. Also, the second data signals of "E, F, G, H" are provided in forward order, then the first transmitted data signal "E" is inputted to the fifth data driving IC, the second transmitted data signal "F" is inputted to the sixth data driving IC, and the third and fourth transmitted data signals "G" and "H" are inputted to the seventh and eighth data driving ICs, respectively.

As described above, the first data signals are transmitted in reverse order and the second data signals are transmitted in forward order, thereby data signals are serially inputted to the first to the eighth data driving ICs as a whole.

According to an embodiment of the present invention, the plurality of first and second data driving ICs 31~3k and 3k+1~3n store data signals provided from the timing controller 5 in the shift register (not shown) and transmit voltages corresponding to each of the data signals to the display region 100. The plurality of gate driving ICs 21~2m selectively turns on the TFT (not shown) of each pixel so that the voltage is applied to the pixel according to signals transmitted from the plurality of gate driving ICs 21~2m.

According to such an embodiment of the present invention, since the signal transmission film F for transmitting data signals from the PCB 120 is connected to both sides of the plurality of first and second data driving ICs 31~3k and 3k+1~3n, the structure having the plurality of first and second data driving ICs 31~3k and 3k+1~3n in parallel and mounted on the TFT array panel 110, can remarkably reduce the number of the signal transmission film in contrast to the structure in which the transmission film is connected to each of the data driving ICs to apply data signals. As a result, the cost of manufacturing is decreased, and the mounting space reduced, thereby the overall structure is simplified and operates effectively.

Further, since data signals are not inputted to only one side of a plurality of data driving ICs disposed in parallel but inputted to both sides thereof, the same level of voltage is applied, thereby reducing errors in operations.

Although the embodiment mentioned above has been explained with the structure of a plurality of data driving ICs being disposed in parallel, and data signals are inputted to both sides, and are shifted forward the middle, the present invention is not limited to such configuration but includes a configuration wherein data signals are inputted to any two of a plurality of data driving ICs and shifted toward a centralized portion of the selected data driving ICs.

Figure 4:
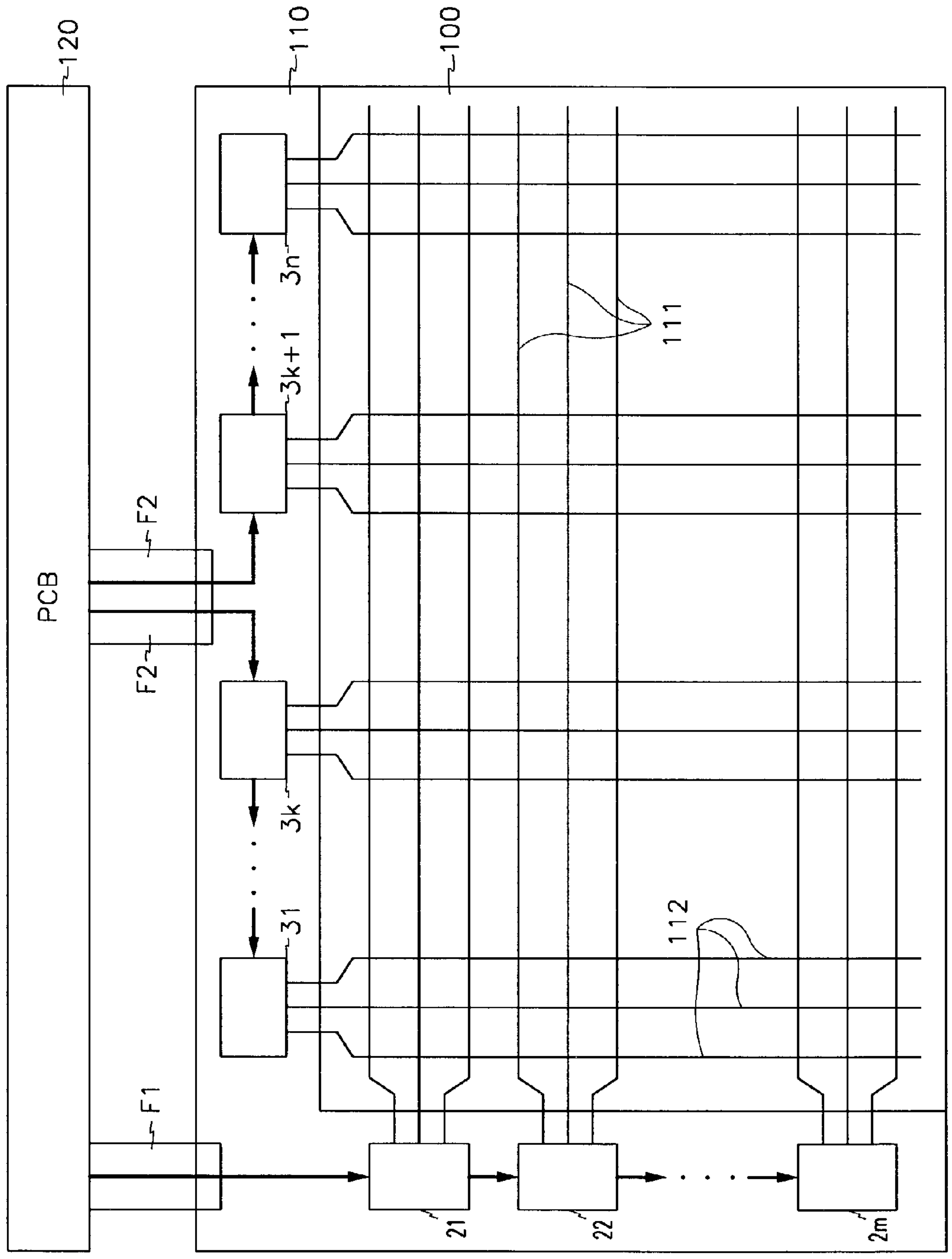
FIG. 4 is schematic diagram of an LCD according to another embodiment of the present invention.

FIG. 4 shows a schematic structure of an LCD according to a second embodiment of the present invention.

Referring to FIG. 4, the LCD includes a TFT array panel 110, a PCB 120, and a signal transmission film having first signal transmission film F1 and a second signal film F2. According to an embodiment of the present invention, the structure of the LCD of the second embodiment is similar to the first embodiment of the present invention except an arrangement of the signal transmission film having the first signal transmission film F1 and a second signal film F2.

According to an embodiment of the present invention, the first transmission film F1 includes a third lead wire for transmitting scanning signals provided from the PCB 120 to the plurality of the gate driving ICs 21~2m. The third lead wire is connected to a signal wire of the first gate driving IC 21 for transmitting scanning signals. The second transmission film F2 includes at least two lead wires, such as a first lead wire connected to the kth data driving IC 3k for transmitting first data signals and a second lead wire connected to the (3k+1)th data driving IC 3k+1 for transmitting second data signals provided from the PCB 120.

Thus, scanning signals are transmitted through the first transmission film F1 and inputted to the first gate driving IC 21, and the scanning signals are transmitted to the mth gate driving IC 2m by shift operation like the first embodiment. The first and second data signals are transmitted through the second transmission film F2 and inputted to the kth data driving IC 3k and the (k+1)th data driving IC 3k+1, respectively, and the inputted first and second data signals are transmitted to the first driving IC 31 and the nth driving IC 3n, respectively. That is, the plurality of first and second data driving ICs 31~3k and 3k+1~3n are disposed in parallel, data signals are inputted to specific data driving ICs disposed adjacently, then diverged from the specific data driving ICs to both ends which are the opposite sides.

Accordingly, the first data signals transmitted through the second transmission film F2 is inputted to the kth data driving IC 3k and transmitted to the first data driving IC 31, and the second data signals transmitted through the second transmission film F2 is inputted to the (k+1)th data driving IC 3k+1 and transmitted to the nth data driving IC 3n, wherein k is 1<k<n (k and n are integers). Preferably, k is n/2.

Similarly to the first embodiment, the direction of shift of the respective plurality of first and second data driving ICs 31~3k and 3k+1~3n is determined according to whether a VDD or a GND voltage is applied to the shift direction selecting terminal S of the plurality of first and second data driving ICs.

According to an embodiment of the present invention, a timing controller 5 of the PCB 120 outputs the first data signals forwardly and the second data signals backwardly so that the first and second data signals are sequentially inputted to the first data driving IC 31 to the nth data driving IC 3n disposed in parallel. That is, as illustrated by example in the first embodiment, when data signals of "A, B, C, D, E, F, G, H" are provided, the first data signals of "A, B, C, D" are provided in order of "A, B, C, D", then the first transmitted data signal "A" is inputted to the fourth data driving IC and shifted to the first data driving IC, and the second transmitted data signal "B" is inputted to the second data driving IC, the third transmitted data signal "C" is inputted to the third data driving IC, and the fourth transmitted data signal "D" is inputted to the fourth data driving IC. Also, the second data signals of "E, F, G, H" are provided in reverse order, then the first transmitted data signal "H" is inputted to the fifth data driving IC, and the second transmitted data signal "G" is inputted to the seventh data driving IC, with the result that "E, F, G, H" is inputted to the fifth to the eighth data driving IC, respectively.

The input order of the first and the second data signals is controlled by the shift direction selecting terminal S, and respective data signals are applied to pixels by data driving ICs depending on gate signals like the first embodiment.

According to an embodiment of the present invention, one skilled in the art can readily appreciate that the second transmission film F2 can be connected to the plurality of data driving ICs in other ways. For example, the first lead wire of the second transmission film F2 can be connected to the first data driving IC 31 for transmitting the first data signals and a second lead wire of the second transmission film F2 can be connected to the nth data driving IC 3n for transmitting the second data signals.

In accordance with the second embodiment, like the first embodiment, the structure of the plurality of data driving ICs 31~3k and 3k+1~3n being disposed in parallel and mounted on the TFT array panels reduces the transmission frequency of the data signal, and reduces the error rate due to differing levels of voltages applied to each of the data driving ICs.

Alternatively, the LCD according to the embodiment of the present invention can be applied to low voltage differential signaling (LVDS) and reduced swing differential signaling (RSDS), and thereby the data signal can be transmitted to the plurality of data driving ICs as described above.

As described above, the present invention, in the LCD of a plurality of data driving ICs being disposed in parallel, reduces the number of transmission films needed for connecting the PCB with the plurality of gate and data driving ICs. Advantageously, the illustrative structure according to the present invention is less error prone and is less expensive in cost of manufacturing. Since data signals are transmitted from both sides of the plurality of the data driving ICs, it is possible to transmit data signals at high speed. Since resistance of wires is reduced, the same level of data signals is transmitted. Also, since the transmission frequency of data signals can be decreased, it is possible to overcome the limit of frequency, and the number of transmission films is smaller to thereby reduce the time of manufacturing and to minimize poor connection.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display (LCD) comprising:

a display region formed on an array panel having a plurality of gate lines and a plurality of data lines arranged in rows and columns, respectively;

a data driving unit having a plurality of first data driving integrated circuits (ICs) and a plurality of second data driving ICs located proximal to the first data driving ICs, the plurality of first data driving ICs providing first data signals to a corresponding plurality of first data lines and the plurality of second data driving ICs providing second data signals to a corresponding plurality of second data lines;

a gate driving unit having a plurality of gate driving ICs for providing scanning signals to the plurality of gate lines; and a signal transmission film having a first signal transmission film and a second transmission film, the first transmission film transmitting the scanning signals to the gate driving unit and the first data signals to the plurality of first data driving ICs, and the second transmission film transmitting the second data signals to the plurality of second data driving ICs, wherein the first data signals are serially shifted into the plurality of first data driving ICs and the second data signals are serially shifted into the plurality of second data driving ICs.

2. The LCD in accordance with claim 1, wherein each of the plurality of first data driving ICs and the plurality of second driving ICs includes a shift direction selecting terminal, the shift direction selecting terminal is connected to a first voltage for shifting the first data signals in reverse order and connected to a second voltage for shifting the second data signals in forward order.

3. The LCD in accordance with claim 1, wherein the first and the second data signals are low voltage differential signals (LVDS) or reduced swing differential signals (RSDS).

4. The LCD in accordance with claim 1, further including a printed circuit board (PCB) having a timing controller, wherein the PCB is connected to the signal transmission film and the timing controller transmits the first data signals and the second data signals to the signal transmission film.

5. The LCD in accordance with claim 1, wherein the data driving unit is disposed at one edge of the array panel and the gate driving unit is disposed at the other edge of the array panel.

6. A liquid crystal display (LCD) comprising:

a display region formed on an array panel having a plurality of gate lines and a plurality of data lines arranged in rows and columns, respectively;

a data driving unit having a plurality of first data driving integrated circuits (ICs) and a plurality of second data driving ICs located proximal to the first data driving ICs, the plurality of first data driving ICs providing first data signals to a corresponding plurality of first data lines and the plurality of second data driving ICs providing second data signals to a corresponding plurality of second data lines;

a gate driving unit having a plurality of gate driving ICs for providing scanning signals to the plurality of gate lines;

a signal transmission film having a first signal transmission film and a second transmission film, the first transmission film transmitting the scanning signals to the gate driving unit and the first data signals to the plurality of first data driving ICs, and the second transmission film transmitting the second data signals to the plurality of second data driving ICs;

wherein the first data signals are inputted to a first data driving IC and shifted to a kth data driving IC, and the second data signals are inputted to a nth data driving IC and shifted to a (k+1)th data driving IC, wherein n is the total number of the data driving ICs, k is the number of the Plurality of first data driving ICs, (n−k) is the number of the plurality of second data driving ICs, and k is $1<k<n-1$.

7. The LCD in accordance with claim 6, wherein the first data signals inputted to the first data driving IC are provided in reverse order from the shifting of second data signals inputted to the second data driving ICs.

8. A liquid crystal display comprising:

a display region formed on an array panel having a plurality of gate lines and a plurality of data lines arranged in rows and columns, respectively;

a data driving unit having a plurality of first data driving ICs and a plurality of second data driving ICs located proximal to the first data driving ICs, the plurality of first data driving ICs providing first data signals to a corresponding plurality of first data lines and the plurality of second data driving ICs providing second data signals to corresponding plurality of second data lines;

a gate driving unit having a plurality of gate driving ICs for providing scanning signals to the plurality of gate lines; and a signal transmission film having a first signal transmission film for transmitting the first data signals to the plurality of first data driving ICs and having a second signal transmission film for transmitting the second data signals to the plurality of second data driving ICs, wherein the first data signals inputted to the first data driving ICs are provided in a forward order and the second data signals inputted to the second data driving ICs are provided in a reverse order.

9. The LCD in accordance with claim 8, wherein each of the plurality of first data driving ICs and the plurality of second driving ICs includes a shift direction selecting terminal, the shift direction selecting terminal is connected to a first voltage for shifting the first data signals in the forward order and the shift direction selecting terminal of the plurality of second data driving ICs is connected to a second voltage for shifting the second data signals in the reverse order.

10. The LCD in accordance with claim 8, wherein the first data signals are serially shifted into the first data driving ICs and the second data signals are serially shifted into the plurality of second data driving ICs.

11. The LCD in accordance with claim 8, wherein the first and the second data signals are low voltage differential signals (LVDS) or reduced swing differential signals (RSDS).

12. A liquid crystal display comprising:

a display region formed on an array panel having a plurality of gate lines and a plurality of data lines arranged in rows and columns, respectively;

a data driving unit having a plurality of first data driving ICs and a plurality of second data driving ICs located proximal to the first data driving ICs, the plurality of first data driving ICs providing first data signals to a corresponding plurality of first data lines and the plurality of second data driving ICs providing second data signals to corresponding plurality of second data lines;

a gate driving unit having a plurality of gate driving ICs for providing scanning signals to the plurality of gate lines;

a signal transmission film for transmitting the first data signals to the plurality of first data driving ICs and the second data signals to the plurality of second data driving ICs; and wherein the first data signals are inputted to a kth data driving IC and shifted to a first data driving IC, and the second data signals are inputted to a (k)th data driving IC and shifted to a nth data driving IC, wherein n is the total number of the data driving ICs, k is the number of the plurality of first data driving ICs, (n−k) is the number of the plurality of second data driving ICs, and k is $1<k<n-1$.

13. A liquid crystal display comprising:

a display region formed on an array panel having a plurality of gate lines and a plurality of data lines arranged in rows and columns, respectively;

a data driving unit having a plurality of first data driving ICs and a plurality of second data driving ICs located proximal to the first data driving ICs, the plurality of first data driving ICs providing first data signals to a corresponding plurality of first data lines and the plurality of second data driving ICs providing second data signals to corresponding plurality of second data lines;

a gate driving unit having a plurality of gate driving ICs for providing scanning signals to the plurality of gate lines; and a signal transmission film for transmitting the first data signals to the plurality of first data driving ICs and the second data signals to the plurality of second data driving ICs, wherein the first data signals are inputted to a first data driving IC and shifted to a kth data driving IC, and the second data signals are inputted to a nth data driving IC and shifted to a (k+1)th data driving IC, wherein n is the total number of the data driving ICs, k is the number of the plurality of first data driving ICs, (n−k) is the number of the plurality of second data driving ICs, and the k is $1<k<n-1$.

14. The LCD in accordance with claim 13, wherein the first data signals inputted to the first data driving IC are provided in reverse order, and the second data signals inputted to the nth data driving IC are provided in forward order.

15. The LCD in accordance with claim 14, wherein each of the plurality of first data driving ICs and the plurality of second driving ICs includes a shift direction selecting terminal, the shift direction selecting terminal is connected to a first voltage for shifting the first data signals in reverse order and connected to a second voltage for shifting the second data signals in forward order.

16. A method of driving an LCD comprising a display region formed on an array panel having a plurality of gate lines and a plurality of data lines arranged in rows and columns, respectively; a data driving unit having a plurality of first data driving integrated circuits (ICs) and a plurality of second data driving ICs located proximal to the first data driving ICs; a gate driving unit having a plurality of gate driving ICs; and a signal transmission film having a first signal transmission film and a second transmission film, the method comprising the steps of:

serially shifting first data signals into the plurality of first data driving ICs in a forward order; and serially shifting second data signals into the plurality of second data driving ICs in a reverse order, wherein the shifting into the first and second data driving ICs occurs at the same time.

17. The method in accordance with claim 16, wherein the first data signals are inputted to a first data driving IC of the first data driving ICs through the first signal transmission film and shifted in the forward order to a kth data driving IC of the first data driving ICs; and the second data signals are inputted to a nth data driving IC of the second data driving ICs through the second signal transmission film and shifted in the reverse order to a (k+1)th data driving IC of the second data driving ICs, wherein n is the total number of the data driving ICs, k is the number of the plurality of first data driving ICs, (n−k) is the number of the plurality of second data driving ICs, and k is $1<k<n-1$.

18. A method of driving an LCD comprising a display region formed on an array panel having a plurality of gate lines and a plurality of data lines arranged in rows and columns, respectively; a data driving unit having a plurality of first data driving integrated circuits (ICs) and a plurality of second data driving ICs located proximal to the first data driving ICs; a gate driving unit having a plurality of gate driving ICs; and a signal transmission film having a first signal transmission film and a second transmission film, the method comprising the steps of:

serially shifting first data signals from a kth data driving IC to a first data driving IC; and serially shifting second data signals from a (k+1)th data driving IC to a nth data driving IC, wherein n is the total number of the data driving ICs, k is the number of the plurality of first data driving ICs, (n−k) is the number of the plurality of second data driving ICs, and the k is $1<k<n-1$.

19. The LCD in accordance with claim 18, wherein the first data signals inputted to the first data driving ICs are provided in forward order from the shifting of second data signals inputted to the second data driving ICs.

* * * * *